Feb. 20, 1940.   J. A. SAFFIR ET AL   2,191,402
PHOTOGRAPHIC ILLUMINATING EQUIPMENT
Filed Aug. 25, 1939   2 Sheets-Sheet 1
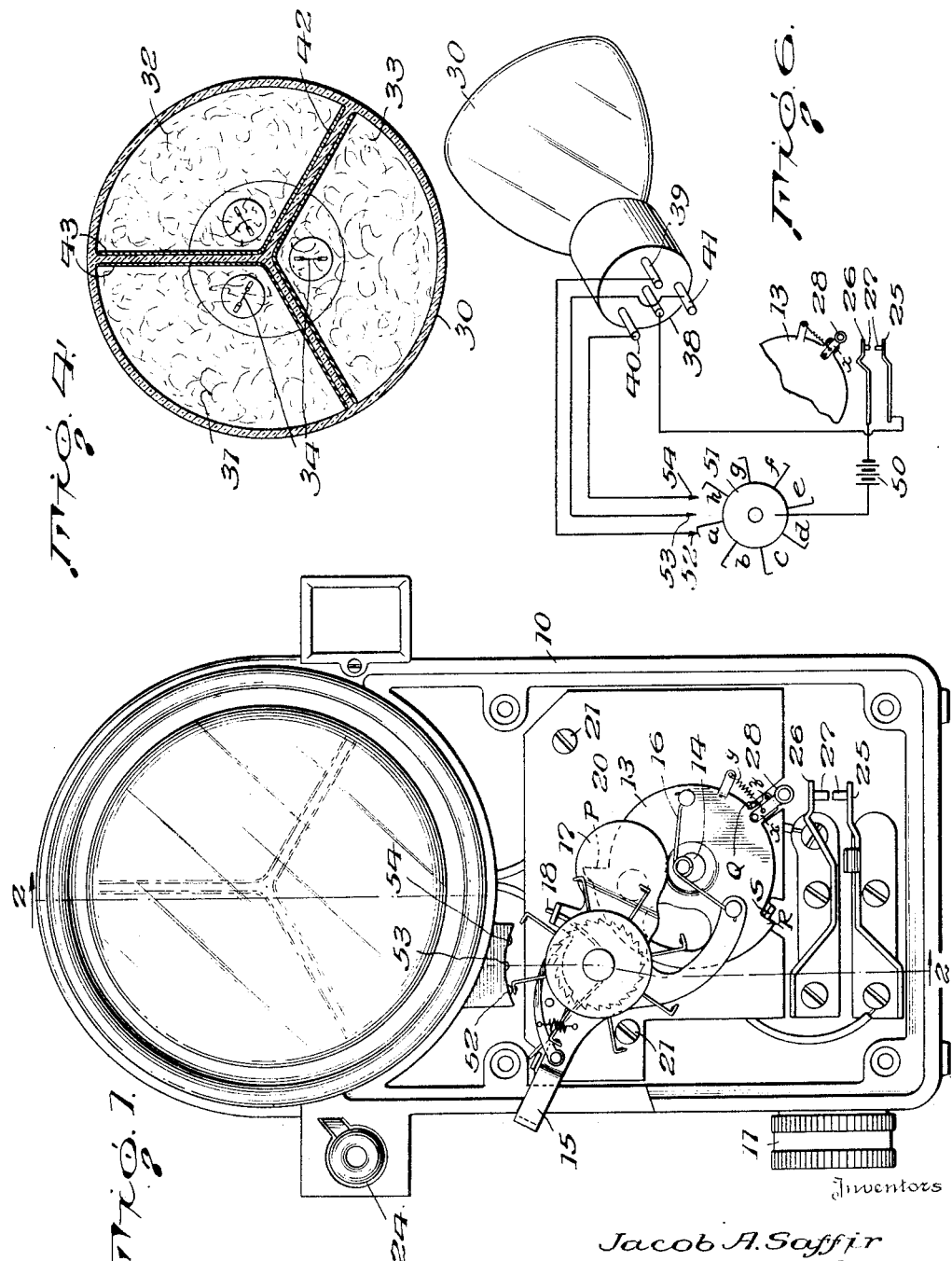
Inventors
Jacob A. Saffir
Henry G. Bartsch
By Henry G. Bartsch
Attorney

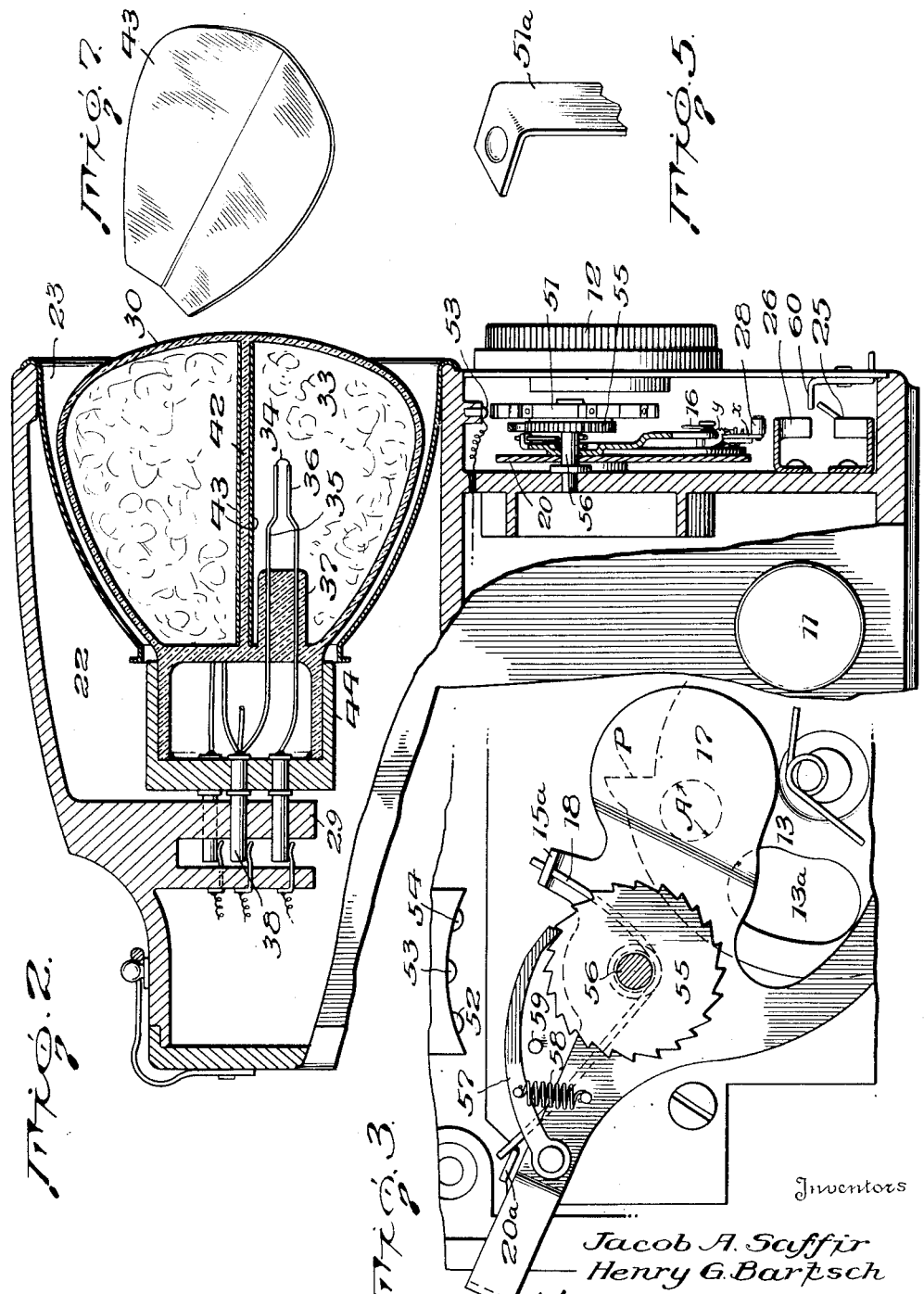

Patented Feb. 20, 1940

2,191,402

UNITED STATES PATENT OFFICE 2,191,402

PHOTOGRAPHIC ILLUMINATING EQUIPMENT

Jacob A. Saffir, Chicago, Ill., and Henry G. Bartsch, Washington, D. C.; said Bartsch assignor to said Saffir Application August 25, 1939, Serial No. 291,982

13 Claims. (Cl. 67—29)

Our invention relates to improvements in photographic equipment and has to do, more particularly, with the provision of novel photoflash lighting means especially designed for repeated quick availability as a photographic illuminator.

Photo lamp equipment consisting of a light-pervious, pressure-resistant hermetically-sealed envelop charged with light-generative material subject to electrical ignition under accurate control of a camera-shutter-synchronized switch has, during the past decade, practically displaced the flash powder gun in photographic use. Safe, quickly-replaceable, low-cost photoflash bulbs of low-power ignition requirements, prolonged-peak flash duration and high light-intensity have been available on the market for several years. Satisfactory camera-shutter synchronizing switches have also been devised for use with such photoflash bulbs and, as a result, such equipment has enjoyed widespread adoption not only by professional photographers, but by amateurs as well.

In spite of the fact that such equipment has come into general use, all hitherto-known arrangements are characterized by several salient disadvantages, probably the most formidable of which is bulkiness. Fine cameras have been devised which are small and light enough, including an adequate supply of film, to be comfortably carried in an ordinary coat pocket, yet it is a common sight, in any large city, to see a news photographer trudging along with what resembles a fair-sized suitcase containing—not his camera—but merely a judiciously limited supply of replacement photoflash bulbs. Not only is such a carrying case a real piece of impedimenta in the work of the profession, but, as many can testify, the case is frequently mistaken for an object of high intrinsic value and stolen in an unguarded moment, to the abortion of what otherwise might have been "a scoop."

It is, accordingly, a primary object of our invention to provide multi-flash illuminating equipment for photographic work which is, in its entirety, far more compact and portable than hitherto-known prior art arrangements of equal capacity.

Photoflash equipment heretofore available has another important disadvantage in that it is capable of only a single instance of use and is dependent, for re-use, upon replacement of the fired bulb element—an operation requiring an appreciable period of time. Cameras have been devised and are in use which, upon exposure of one film section, automatically "reload" almost instantaneously with a fresh section of sensitized film so that a plurality of exposures may be made during a fleeting moment of activity. No photoflash equipment has been devised, prior to our invention, whereby such rapidly operative camera equipment may be advantageously employed in night photography.

Our invention has, as another important object thereof, the provision of automatic repeater-type photoflash equipment capable of conjoint use with such self-loading, rapid-exposure cameras.

Further objects, and objects relating to details of utility, expedients in construction and economies in manufacture and marketing will definitely appear from the detailed description which follows. In one instance, we accomplish the objects of our invention by the means and methods set forth in the following specification. Our invention is clearly defined in the appended claims. One structure constituting a preferred embodiment of our invention is illustrated in the accompanying drawings, in which:

Figure 1 is a front plan view of a well-known conventional type of camera into which has been incorporated an automatic repeater-type photoflash illuminator constituting an embodiment of our invention; the lens mount of said camera having been removed to reveal details of the flash control means of the equipment;

Fig. 2 is a longitudinal sectional view of the same camera and taken on the line 2—2 of Fig. 1, a rear portion of the camera case being shown in side elevation and deleted as irrelevant to our invention;

Fig. 3 is a detail sectional view of the rotary shutter, its actuating lever and the commutating-switch-driving mechanism associated therewith, the figure being drawn to an enlarged scale for the sake of clarity in illustration;

Fig. 4 is a transverse sectional view of the light-generative element of the device revealing the compartmented structure thereof and the heat and light-baffling means associated with its partitions for precluding cross-firing of the segregated charges contained therein;

Fig. 5 is a detail perspective view of the outer portion of one of the contact fingers of the commutating switch forming a part of our device, the view being drawn to an enlarged scale;

Fig. 6 is a circuit diagram of the electrical wiring details of the device illustrated in Figs. 1 and 2; and Fig. 7 is a perspective view of one of the heat and light baffles associated with the partitions of the light-generative element illustrated in Figs. 2 and 4.

Similar reference numerals refer to similar parts throughout the several views.

In a broad sense, our invention finds embodiment in a repeating flash lamp of the instantaneous-combustion type consisting of a light-pervious envelop of glass or similar material containing a plurality of charges of light-generative combustible material, each individually associated with a selectively-operative electrical igniter, and means within the envelop for positively so segregating said individual charges and the gases or vapors individually evolved thereby as to prevent diffusion and precipitation of the latter upon the entire inner surface of the envelop. By virtue of the thus-insured localization of vapor precipitation, it is possible to secure identical effective light values from each charge as fired and, when our device is employed for photographic purposes, uniformity of exposure with predeterminable accuracy may be realized. Some light-generative combustible materials are susceptible of auto-ignition by radiated actinic rays of the wavelengths generated by their combustion. Where such photo-ignitible materials are employed, the means which serve as barriers for the evolved gaseous products of combustion also comprise actinic filter means for precluding inadvertent ignition of adjacent charges within the envelop.

Having set forth the basic principles of our invention, reference is now made to the accompanying drawings in which we have depicted our invention as applied to a well-known make of box camera provided with a shutter-synchronized switch for timing the moment of ignition of an inbuilt photo-flash lamp. Conventionally, this camera comprises a case proper 10 of one-piece molded construction, a film carrier (not shown), a film-winding knob 11, a mounted lens 12 in alignment with the camera aperture A, a shutter 13 mounted for rotation upon a pin 14, a shutter-actuating lever 15 snap-action coupled with the rotary shutter by the usual trigger spring 16, which lever also carries a "blinder" plate 17 for traversing the camera apertures A and 13a during the return cycle of shutter motion, thereby preventing double exposure of the sensitized film (not shown) upon release of the lever 15 and its return to "up" position under the urge of its spring 18. The entire shutter mechanism is carried upon the plate 20 secured to the case 10 by screws 21.

Thus described, the camera construction is a common one in the art. In addition, the illustrated camera case 10 includes a compartment 22 for the reception of a flash bulb, which compartment includes a reflector member 23 of pressed metal suitably secured to the case 10 and adapted to reflect a good portion of the light generated by the bulb receivable therein. A compartment 24 for the reception of a "pen-light" battery 50 (identified in Fig. 6) is also provided in the case 10, and a switch consisting of a pair of spring arms 25 and 26 each provided with a contactor portion 27 controls the application of battery current to the igniter element of the flash lamp.

Being flexible and mounted at its rear extremity, the spring arm 26 is subject to depression by the roller 28 carried on a radial extension of the rotary shutter 13, which contact-actuating roller is so positioned, relative to the shutter aperture 13a and the switch elements 25, 26 and 27, as to effect closure of the lamp-firing circuit at the instant of shutter opening, whereby the camera film is exposed to the lamp-generated light reflected from the object to be photographed.

Thus described, the camera is that currently manufactured and sold by the Utility Manufacturing Company of New York under the name "Falcon Press Flash". No claim is made to that camera, nor are the concepts of our invention restricted to embodiment in cameras of this or any other specific construction, it being obvious that, in its broader aspects, the invention is capable of construction even as a distinct, separately manually-operable unit.

Referring now to the novel structure of the illustrated arrangement which constitutes a preferred embodiment of our contribution to the art, the flash lamp proper consists of an hermetically-sealed envelop portion 30 enclosing three distinct charges 31, 32, 33 of combustible material such as filamentary or foil aluminum or magnesium metal in a suitable atmosphere such as oxygen capable of supporting combustion thereof. Each said charge of combustible material has, closely and individually associated therewith, an electrically-activated igniter element which, in the present instance, comprises a short fusible filament 34 supported upon heavier wires 35, 36, passing through a boss 37 integral with the envelop 30 and forming a portion of the wall thereof. The several supporting wires 35 are terminally connected to a common central contact pin 38, and the several independent lead wires 36 each are terminally connected to individual contact pins 39, 40 and 41, which latter and the common pin 38 are embedded in the lamp base element 44 into which the base flange of the envelop 30 is disposed for support. The several pins 38, 39, 40 and 41 each extend through a complementary socket 29 formed as an integral part of the case 10 and support the lamp in a manner conventional in the radio-tube socket art.

From the foregoing, it will be apparent that each of the individual charges 31, 32, and 33 within the envelop 30 may be caused to combust and evolve light by the simple expedient of connecting a source of electricity across the contact pins 38 and 39 or 40 or 41, respectively.

In accordance with certain specialized concepts of our invention, means are provided for effecting automatic selective firing of the individual charges 31, 32 and 33 and will later be described. To the end that such selective individual ignition function successfully for photographic purposes, means are provided within the envelop for preventing unrestricted diffusion of the gases or vapors evolved by combustion. Such combustion products, as is well known, precipitate readily and fog the surfaces to which they have access. Unless such diffusion and precipitation within the envelop be localized to the immediate vicinity of the charge fired, subsequent firing of adjacent charges within the common envelop will yield illumination of materially-diminished effective photographic value and uniformity of film exposure is impossible of attainment.

In the illustrated repeating flash lamp construction, diffusion-localizing means are provided which comprise a glass partition wall 42 having three radiating sections which merge peripherally into integrality with the envelop 30 and define, therein, three similar compartments of sectoral cross section, each receptive of a charge 31, 32 or 33. Each charge of combustible material is thereby hermetically isolated from its neighbors and the nebulous products of combustion and their precipitates are restricted to the respective compartment in which combustion is effected. Thus, regardless of the fogging which will unavoidably occur in that compartment of the envelop as the result of combustion of its charge, substantially no interference with the light-radiation from the charges in the adjacent compartments is experienced.

Some combustible materials employed in photoflash lamp construction are extremely unstable when exposed to radiant heat and/or light of the character which their combustion generates. It is well known that one such charged lamp fired in close proximity to another may induce, by radiant actinic phenomenon, the ignition of the other lamp. Accordingly, and where such unstable materials are employed in lamps of our design, it is a supplemental feature of our invention to provide light-filter means therein which are desirably poor in light and heat conductivity. In the illustrated embodiment of our invention, this means consists of three butterfly sheets 43 of thin, light-reflective asbestos paper which, by virtue of a slight inherent resiliency in the common fold line of their angularly related wing portions, snugly lie upon the surfaces of the partition member 42 defining each respective envelop compartment and serve several purposes: First, the combustible charge of the adjacent compartments is thereby shielded against direct actinic radiation from the charge fired. Second, heat of combustion of one charge is conducted to adjacent charges only after an extended period of time such as to preclude attainment of charge-igniting temperatures in adjacent compartments. Third, the glass of the partition wall 42 is insulated from direct contact with incandescent particles of combusting material, and localized stresses otherwise tending to fracture the glass partition are avoided. Fourth, if the asbestos sheet material employed be white in color, considerable light-reflection from its surface is realized, to the increase of illuminating efficiency.

While natural radiation of heat from the envelop proper 30 is generally adequate to insure against its fracture by uneven localized contact with the combusting charge, suitable light-pervious, heat-protective coatings may be employed upon the inner surface thereof if found expedient.

With the foregoing description of the repeater-type lamp element in mind, the illustrated mechanism for its selective actuation may be readily described and the operation of the entire structure may be clearly understood.

Referring to the wiring diagram of Fig. 6 of the drawings, it will be seen that the common contact pin 38 of the flash bulb is electrically connected to the lower contact arm 25 of the shutter-actuated switch. The shutter-motivated contact arm 26 of the said switch is electrically connected with one terminal of the igniter battery 50, and the other terminal of the battery 50 is selectively connected with one of the contact pins 39, 40 or 41 through a step-by-step operating switch comprising a rotary commutator 51 having eight cup-ended contact fingers a, b, c, d, e, f, g and h, one only of which is engageable at any time with a switch contact 52, 53, or 54 having electrical connection with the bulb pins 39, 40 and 41, respectively. The positional relationship of the several parts illustrated in Fig. 6 is such that clockwise actuation of the camera shutter 13 will cause the roller 28 thereon to depress the arm 26 and complete the circuit through contacts 27 at the moment of shutter opening, thereby effecting synchronized ignition of the charge 31 of the bulb, the igniter element for which is the sole one in circuit with the battery 50 through the commutator switch 51.

While, obviously, the commutator switch 51 may be clockwise-rotated manually an angular distance of 15 degrees after firing of the charge 31 thereby to bring the charge 32 into possible circuit with the battery 50 subject to completion by the shutter-actuated switch arm 26, our invention contemplates automatic accomplishment of this 15 degree, step-by-step, switching by the final or "return" movement of the shutter-actuating lever 15, effected by the spring 18.

The mechanism by which this automatic step-by-step movement of the commutator switch 51 is achieved in a camera of the box type disclosed is well illustrated in Figs. 1, 2 and 3 of the drawings and consists of a serrated disc or rack 55 concentrically secured to the switch 51 and rotatable therewith upon the stub shaft 56 which latter also pivotally supports the lever 15 and the helical portion of the lever-return spring 18 maintained under compression between the lugs 15a and 20a of the lever and plate 20, respectively.

The angular swing of the lever 15 is in the neighborhood of 45 degrees and, since the commutator 51 requires to be rotated but 15 degrees per step, the operating connection therebetween is of the "lost-motion" type. This lost-motion connection is effected, in the embodiment illustrated, by a pawl 56 normally urged toward engagement with the rack by a light spring 58, and a pawl-elevating pin 59 extending from the plate 20 permits contact of the pawl with the teeth of the rack 55 only when the lever is well within 30 degrees of its top limit of movement. Thus, a rack advancement of more than 15 degrees (one tooth) is impossible during the return stroke of the lever 15 under the urge of its spring 18.

Preferably, the extent of angular swing in the shutter 13 (determined by the stop portions P—Q and R—S of the shutter and plate) is such that return movement of the shutter 13 to the position of rest depicted in Fig. 1 is effected by the snap spring 16 prior to the final five degrees or so of return movement in the lever 15. Accordingly, depression of the arm 26 by the roller 28 during the return swing of the shutter is ineffective to fire a succeeding lamp charge 32, 33, or 31 for the reason that the electrical circuit for the ignition of the succeeding charge has not, at the moment of return of the shutter, been arranged through the commutator 51 and the appropriate contact 53, 54, or 52.

To the end, however, that such inadvertent operation of the lamp be precluded independent of reliance upon accurate timing of the moment of shutter return relative to arrangement of a fresh circuit through the commutator 51, the mount for the roller 28 is of the "slip-past" jointed type comprising an arm x pivoted at its inner end on the shutter and normally held in outstanding radial position thereon by a very light spring y urging the arm x into abutment with a stop pin z. Thus, the arm x will yield easily when its roller 28 engages the contact arm during counter-clockwise or "return" movement of the shutter and will not effect circuit-closing depression of the arm 26 during such return movement of the shutter. Under clockwise shutter actuation, however, the arm x, by virtue of the stop z to which it is urged by the spring y, will function as a rigid support for the roller 28 and will effect positive depression of the arm 26 and momentary engagement of the circuit-closing contacts 27.

For the purpose of rendering the flash lamp mechanism of the camera inoperative at will, and regardless of the position of the arms a, b, c, d, e, f, g and h of the commutator relative to the contacts 52, 53, 54 a cam 60 is provided which is manually operable from the front face of the camera to maintain the lower contact arm 25 of the shutter-actuated switch in slightly depressed position such that depression of the upper arm 26 by the roller 28 is inadequate to complete the ignition circuit through contacts 27.

Having thus described the functional and structural characteristics of the parts illustrated in embodiment of our invention, the mode of operation of the device as a whole should be easily understandable.

Assuming that the camera is loaded with a roll of film and a section thereof is in alignment with the lens and light-aperture A, depression of the lever 15 will lift the blinder plate 17 and also cause the shutter 13 to be instantaneously sprung through the trigger spring 16, bringing the aperture 13a into alignment with the lens and aperture A, exposing said film section in conventional fashion.

By virtue of the electrical circuit connections depicted in Fig. 6, depression of the contact arm 26 at the instant of shutter opening will close the battery circuit involving the charge 31 of the bulb, illuminating the object to be photographed. Manual release of the lever 15 will result in its upward movement under the influence of its spring 18, during which movement the lowering of the blinder plate 17 precludes re-exposure of the film section as the shutter 13 snaps back to initial position by the action of spring 16.

Referring now to Figs. 1, 3 and 6, it will be seen that the pawl 57 which, in lowered positions of the lever 15, is held out of contact with the rack 55 by the stationary pin 59, is, during final stages (the last 20 degrees or so) of lever return movement, permitted to engage the periphery of the rack 55 and abut a tooth thereof effecting a 15 degree clockwise rotation of the commutator switch 51. This 15 degree movement brings the contact 53 of the switch into possible circuit with the battery 50 and the flash lamp charge is thereby automatically ready for firing upon the next depression of the lever 15 and the contact arm 26. Obviously, before so operating the camera, a new section of film should be brought into the field of the lens, as by manually turning the knob 11 in the instant camera. Such film feeding is, in some cameras, an automatic operation. In such self-winding cameras our invention has especial merit.

The operation of the camera to effect the exposure of the second film section is obvious from the previous explanation. Suffice it to point out that the next return movement of the lever 15 is accompanied by engagement of the finger a of the commutator 51 with the contact 54 of the switch such that the device is in readiness for firing of the third charge 33.

Subsequent operation brings the finger b of the commutator 51 into the 3-stage relationships described with finger a, whereafter the fingers c, d, e, f, g and h come into use in sequence, followed again by finger a. Obviously, the illustrated bulb element, when fired three times, must be replaced. Where a bulb of more or less than three compartments is employed, the commutating mechanism and its operation will be modified correspondingly.

By manually depressing the arm 25 of the shutter-actuated switch with the cam 60, the flash lamp may be rendered optionally inoperative, so that the camera may be employed with other sources of illumination. The use of the camera with the flash lamp for one or two exposures, followed by several instances of use without the lamp, does not interfere with its reuse as a flash-lighted camera employing the remaining unfired charges of the bulb, for the contact fingers a, b, c, d, e, f, g and h are ever ready for use. However, to insure against the possibility of alignment of the commutating switch with the contacts of a previously-fired charge of the bulb, any suitable visual indicator may be easily incorporated. For most purposes, however, and especially in the case of low cost cameras, the practical solution of this exigency consists in the rapid re-actuation of the lever 15 until a live charge is reached. The clouding of the individual bulb compartments affords an adequate indication of the extent to which the bulb is capable of reuse. This is another advantage inherent in the partitioned bulb design illustrated.

We are fully aware, and those familiar with the art to which the present invention pertains will appreciate, upon familiarization with the disclosure herein, that the novel concepts of our invention are readily susceptible of structural embodiment in a wide range of equivalent designs. While the automatic, sequentially-operating switch mechanism of the disclosed device is simple and capable of facile incorporation in a camera of the type disclosed, the same ends may be achieved in other forms, built into, or detached from, the camera proper. Likewise, the concepts of the lamp proper, which are the heart of the present invention, are not restricted to embodiment in a bulb of the exact structural design illustrated, either from the standpoint of number, shape or internal construction of the compartments, although, from a commercially practical standpoint, the form of bulb disclosed has salient features of advantage. Moreover, the materials herein mentioned as adapted for use in our illustrated device are capable of substitution by other materials of general functional equivalency. For example, the combustible materials of the lamp may be metallic or non-metallic and the combustion-supporting substance may be solid and directly incorporated therewith instead of gaseous as described. The diffusion barrier for the evolved products of combustion may be of material other than glass and, where combustible materials of considerable stability to actinism are employed, the light-filtering shields employed therewith may be omitted entirely or directly built into the partition walls as by rendering said walls inherently opaque. These and numerous other changes and variants will appear to those skilled in the art upon familiarization with the concepts of our invention herein set forth. We therefore claim our invention broadly, as indicated by the appended claims.

What we claim is:

1. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, electrical contact means external of said envelop, individually connected with said ignition elements and selectively energizable from a source of electrical energy to activate desired ones of said ignition elements at will, and means within said envelop for restricting diffusion of the gaseous products evolved by combustion of each charge to the immediate vicinity of that charge and positively preventing precipitation thereof upon other charges or upon the interior surfaces of said envelop adjacent to said other charges.

2. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated gnition elements, one functionally associated with each of said combustible charges, electrical contact means external of said envelop, individually connected with said ignition elements and selectively energizable from a source of electrical energy to activate desired ones of said ignition elements at will, and opaque barrier means within said envelop for restricting radiation generated by combustion of each individual charge against direct impingement upon an adjacent charge within said envelop, said barrier means also restricting diffusion of the gaseous product evolved by combustion of each charge to the immediate vicinity of that charge and positively preventing precipitation thereof upon other charges or upon the interior surfaces of said envelop adjacent to said other charges.

3. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, electrical contact means external of said envelop, individually connected with said ignition elements and selectively energizable from a source of electrical energy to activate desired ones of said ignition elements at will, and barrier means of low heat-conductive character within said envelop for restricting direct thermal radiation generated by combustion of each individual charge against access to an adjacent charge within said envelop, said barrier means also restricting diffusion of the gaseous products evolved by combustion of each charge to the immediate vicinity of that charge and positively preventing precipitation thereof upon other charges or upon the interior surfaces of said envelop adjacent to said other charges.

4. A repeating flash lamp of the instantaneous combustion type, comprising: an envelop structure having light-pervious exterior walls and having interior walls defining therewith a plurality of individual non-communicating hermetically-sealed cells integrally provided with a common mounting means, a distinct charge of light-generative combustible material disposed within each cell, a quantity of combustion-supporting substance within each cell adequate to support combustion of the entire quantity of combustible material disposed within each respective cell, a plurality of electrically-activated ignition elements, one functionally associated with each of said combustible charges, and electrical contact means incorporated with said integral mounting means, individually connected with said ignition elements and selectively energizable from a source of electrical energy to activate desired ones of said ignition elements at will.

5. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, electrical contact means external of said envelop, individually connected with said ignition elements and selectively energizable from a source of electrical energy to activate desired ones of said ignition elements at will, partition means within said envelop dividing the space therewithin into a plurality of individual non-communicating cells each provided with one of said charges of combustible material, one of said ignition elements and a part of said quantity of combustion-supporting material adequate to insure combustion of said charge, and means incorporated with the common walls of said cells for precluding auto-ignition of each of said charges by actinic radiation from an adjacent charge as it is electrically fired.

6. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, electrical contact means external of said envelop, individually connected with said ignition elements and selectively energizable from a source of electrical energy to activate desired ones of said ignition elements at will, partition means within said envelop dividing the space therewithin into a plurality of individual non-communicating cells each provided with one of said charges of combustible material, one of said ignition elements and a part of said quantity of combustion-supporting material adequate to insure combustion of said charge, and means incorporated with the common walls of said cells for precluding auto-ignition of each of said charges by actinic radiation from an adjacent charge as it is electrically fired, said last-mentioned means comprising an opaque sheet of non-combustible material of low heat-conductivity disposed within each cell in flat coextensive relation to said partition means.

7. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, electrical contact means external of said envelop, individually connected with said ignition elements and selectively energizable from a source of electrical energy to activate desired ones of said ignition elements at will, partition means within said envelop dividing the space therewithin into a plurality of individual non-communicating cells each provided with one of said charges of combustible material, one of said ignition elements and a part of said quantity of combustion-supporting material adequate to insure combustion of said charge, and means incorporated with the common walls of said cells for precluding auto-ignition of each of said charges by actinic radiation from an adjacent charge as it is electrically fired, said last-mentioned means comprising a thin opaque sheet of light-reflective asbestos composition disposed within each cell in flatwise coextensive relation to said partition means.

8. A repeating flash lamp of the instantaneous combustion type, comprising: a light-pervious hermetically-sealed envelop, a partition within said envelop dividing the space therewithin into three identical individual non-communicating cells of sectoral cross section, identical charges of light-generative combustible material in each of said cells, identical quantities of combustion-supporting substance in each of said cells, an electrically activated ignition element in each of said cells functionally associated with the combustible charge therein, electrical contact means external of said envelop, individually connected with said ignition elements and selectively energizable from a source of electrical energy to permit individual activation of a selected ignition element at will, and means for precluding auto-ignition of each of said charges by actinic radiation from an adjacent one of said charges as it is electrically fired, said last-mentioned means consisting of a thin barrier sheet of resilient non-combustible material of angular configuration disposed within each of said cells in substantially flat coextensive relation with the respective portion of said partition.

9. A repeating flash lamp of the instantaneous combustion type, comprising: a light-pervious hermetically-sealed envelop, a partition within said envelop dividing the space therewithin into three identical individual non-communicating cells of sectoral cross section, identical charges of light-generative combustible material in each of said cells, identical quantities of combustion-supporting substance in each of said cells, an electrically activated ignition element in each of said cells functionally associated with the combustible charge therein, electrical contact means external of said envelop, individually connected with said ignition elements and selectively energizable from a source of electrical energy to permit individual activation of a selected ignition element at will, and means for precluding auto-ignition of each of said charges by actinic radiation from an adjacent one of said charges as it is electrically fired, said last-mentioned means consisting of a thin butterfly sheet of resilient asbestos composition disposed within each of said cells in substantially flat coextensive relation with the respective portion of said partition.

10. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically activated ignition elements, one functionally associated with each of said combustible charges, a source of electrical energy, a plurality of electrical contact elements external of said envelop, individually connected with said ignition elements and successively energizable from said source of electrical energy to individually activate said ignition elements in desired timed succession, and means within said envelop for restricting diffusion of the gaseous products evolved by combustion of each charge to the immediate vicinity of that charge and positively preventing precipitation thereof upon other charges or upon the interior surfaces of said envelop adjacent to said other charges.

11. A repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically activated ignition elements, one functionally associated with each of said combustible charges, a source of electrical energy, a plurality of electrical contact elements external of said envelop, individually connected with said ignition elements and disposed in spaced relation, a commutating member for connecting said source of electrical energy with selected ones of said contact elements to effect individual activation of said ignition elements at will, and means for restricting diffusion of the gaseous products evolved by combustion of each charge to the immediate vicinity of that charge and positively preventing precipitation thereof upon other charges or upon the interior surfaces of said envelop adjacent to said other charges.

12. Cooperable with the shutter actuator of a photographic camera, a repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, a source of electrical energy, a plurality of electrical contact elements external of said envelop, individually connected with said ignition elements and disposed in spaced relation, commutating switch means for said contact-elements positively operated with said camera-shutter-actuator to connect said ignition elements to said source of electrical energy individually and successively, said commutating switch means including instantaneously-acting circuit-closing means synchronized with the camera-shutter opening, and means for restricting diffusion of the gaseous products evolved by combustion of each charge to the immediate vicinity of that charge and positively preventing precipitation thereof upon other charges or upon the interior surfaces of said envelop adjacent to said other charges.

13. Cooperable with the shutter actuator of a photographic camera, a repeating flash lamp of the instantaneous combustion type, comprising: a light-pervious hermetically-sealed envelop, a plurality of distinct charges of light-generative combustible material disposed within said envelop, a quantity of combustion-supporting substance within said envelop adequate to support combustion of the entire quantity of combustible material disposed within said envelop, a plurality of electrically-activated ignition elements, one functionally associated with each of said combustible charges, a source of electrical energy, a plurality of electrical contact elements external of said envelop, individually connected with said ignition elements and disposed in spaced relation, commutating switch means for said contact elements positively operated with said camera-shutter-actuator to connect said ignition elements to said source of electrical energy individually and successively, said commutating switch means including instantaneously-acting circuit-closing means synchronized with the camera-shutter opening, means for rendering said commutating switch means optionally inoperative, and means for restricting diffusion of the gaseous products evolved by combustion of each charge to the immediate vicinity of that charge and positively preventing precipitation thereof upon other charges or upon the interior surfaces of said envelop adjacent to said other charges.

JACOB A. SAFFIR.
HENRY G. BARTSCH.